G. VAN RIPER.
Farm-Gates.
No. 148,155.  Patented March 3, 1874.
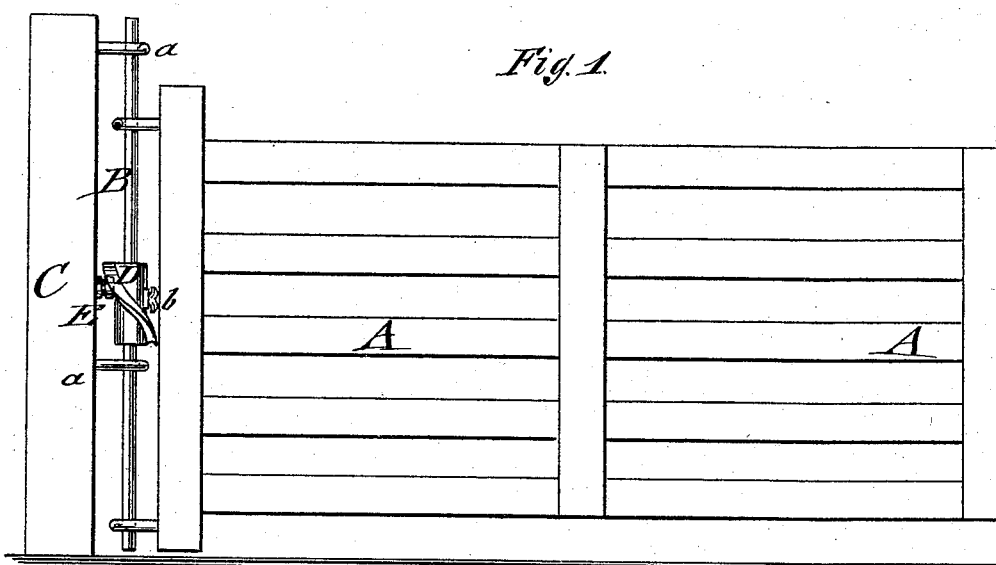
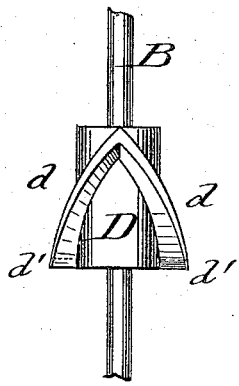
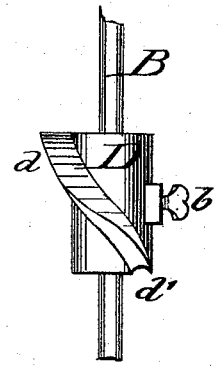
Witnesses:
E. Wolff
O. Sergmek
Inventor:
G. Van Riper
Per
Attorneys.

UNITED STATES PATENT OFFICE.

GEORGE VAN RIPER, OF LA GRANGE, MICHIGAN.

IMPROVEMENT IN FARM-GATES.

Specification forming part of Letters Patent No. 148,155, dated March 3, 1874; application filed January 10, 1874.

*To all whom it may concern:*

Be it known that I, GEORGE VAN RIPER, of La Grange, in the county of Cass and State of Michigan, have invented a new and Improved Gate, of which the following is a specification:

In the accompanying drawing, Figure 1 represents a front view of my improved gate. Figs. 2 and 3 are detail side and front views of the flanged sleeve or cam-wheel, by which the gate is secured in open or closed position.

Similar letters of reference indicate corresponding parts.

The object of my invention is to provide farm and yard gates of all kinds with a cheap and simple device for raising the gate, so as to allow its passage over obstructions, to retain the same in open or closed position, and to make it self-closing.

The gate may be thrown open in either direction, and adjusted in an elevated position, so that it will swing over snow-drifts, or allow smaller stock, as pigs or sheep, to pass under it, without interfering with the working of the gate.

My invention consists in hanging the gate to a pintle or vertical rod which turns in rings or staples of the gate-post, and providing the rod with an adjustable sleeve or cam-wheel, with inverted V-flanges, which flanges are grooved at their lower ends, so as to retain the gate, in connection with a friction-roller of the gate-post, in open or closed position.

In the drawing, A represents a yard or farm gate of the usual construction, which is attached to a vertical pintle or rod, B, which turns in staples or rings $a$ of gate-post C. The sleeve or cam-wheel D, of suitable metal, slides on rod B, and is secured thereon at suitable height by a strong set-screw, $b$, passing through the same. Sleeve D is provided with flanges $d$, arranged in the shape of an inverted V, which curve from the upper end down around the sleeve to the lower edge thereof. The lower ends of flanges $d$ are provided with grooves $d'$ radially to the center of the sleeve, which fit on a friction-roller, E, applied at suitable height above the ground to gate-post C, when the gate is swung open in either direction.

By adjusting sleeve D to the lower part of rod B, the gate A is raised thereby at such suitable height above the ground that it may swing above snow-drifts and other obstructions accumulating thereon, or allow the smaller stock to pass below the gate without necessitating the opening of the gate.

When the sleeve D rests on the roller E in the angle or apex of flanges $d$, the gate is retained thereby in closed position. When it is opened in either direction, the roller E traverses one or the other of the grooves, passes thence along the corresponding flanges $d$ and into grooves $d'$, and thereby secures the gate in the open position.

The gradual raising of the gate by the sleeve during its opening lifts the same over stones or other obstructions, while the weight of the gate carries the same from an open position into the closed one as soon as released from the friction-roller, locking the same automatically to the latch-post.

The sleeve and friction-roller attachment of the gate form thus a very neat, simple, and cheap device for the motion and retention of the gate in the various positions.

Having thus described my invention, I claim as new and desire to secure by Letters Patent—

1. The combination, with the gate A and rod B, of a roller, E, fixed to the post, and adjustable sleeve D, having inverted V-flanges $d$, as shown and described, to operate as specified.

2. The sleeve D, having inverted V-flanges $d$, with terminal grooves $d'$, in combination with roller E, as shown and described, whereby a gate which is connected with the sleeve may be held shut or open, as specified.

GEORGE VAN RIPER.

Witnesses:
 NATHANIEL WHITE,
 SOLOMON CURTIS.